May 12, 1970 S. ROSS 3,512,088

HEADPHONE APPARATUS HAVING SELECTABLE LOUDSPEAKER OR EARPIECE SOUND REPRODUCER

Filed March 14, 1967

INVENTOR
SAMUEL ROSS

BY Hofgren, Wegner, Allen, Stellman & McCord.

ATTORNEYS.

3,512,088
HEADPHONE APPARATUS HAVING SELECTABLE LOUDSPEAKER OR EARPIECE SOUND REPRODUCER

Samuel Ross, Chicago, Ill., assignor to Ross Electronics Corporation, a corporation of Illinois Filed Mar. 14, 1967, Ser. No. 623,030
Int. Cl. H04b *1/08*
U.S. Cl. 325—361 6 Claims

ABSTRACT OF THE DISCLOSURE

A headphone having a loudspeaker mounted adjacent one ear of a wearer and an earpiece for individual sound reproduction mounted for insertion into the opposite ear of the wearer. A radio receiver is built into the headphone, and has tuning and volume controls extending therefrom for manipulation by the wearer, and a switch for selecting either the loudspeaker or the earpiece for sound reproduction.

This invention relates to sound reproducing apparatus, and more particularly to headphone sound reproducing apparatus.

In accordance with the invention, a loudspeaker for producing sound audible to several persons is mounted in a housing adapted to be worn adjacent one ear of a wearer, and an earpiece for individual listening is mounted in a housing adapted to be worn adjacent the opposite ear of the wearer. A switch mounted on one of the housings of the headphone allows the user to select the earpiece or the loudspeaker for reproducing sounds from a radio receiver also contained within one of the housings. The receiver has tuning and volume controls which extend from the housing for manipulation by the wearer.

A principal object of this invention is to provide sound reproducing headphone apparatus for the use, enjoyment, and amusement of a user.

One feature of this invention is the provision of headphone apparatus which may be used for individual sound reproduction or group sound reproduction.

Another feature of this invention is the provision of apparatus including a radio receiver and sound reproducer therefore mounted in a self-contained headphone.

Further features and advantages of the invention will be apparent from the following description and from the drawings, in which.

Figure 1:
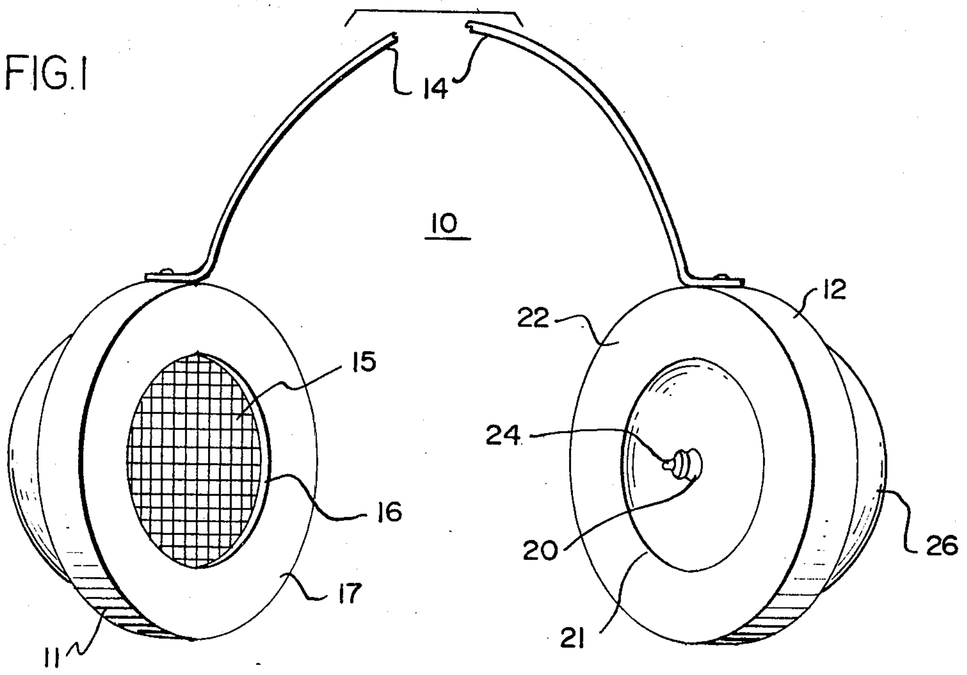
FIG. 1 is a perspective view of the headphone, with the portion mounted adjacent each ear turned outwardly to illustrate details thereof.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

FIG. 1 illustrates a headphone 10 having a first housing 11 adapted to be worn adjacent one ear of a wearer and a second housing 12 adapted to be worn adjacent the opposite ear of the wearer. Housings 11 and 12 are mechanically connected together by a band 14, which may be adjustable, and which fits snugly over the head of the wearer.

Housing 11 contains a loudspeaker 15 directed toward the ear of the wearer through a central aperture 16 in an inner portion 17 of the housing which rests against the head of the wearer. Loudspeaker 15 converts electrical energy into sound waves of sufficient intensity to be heard by a number of persons when the inner surface 17 is removed from its position adjacent the head of the wearer.

Housing 12 contains an earpiece 20 similarly mounted within a central aperture 21 in an inner housing portion 22 adapted to rest against the other ear of the wearer. Earpiece 20 has an elongated portion 24 extending through the central aperture 21 for insertion into the ear of the wearer in order to reproduce sound energy with an intensity suitable for individual listening.

Figure 2:
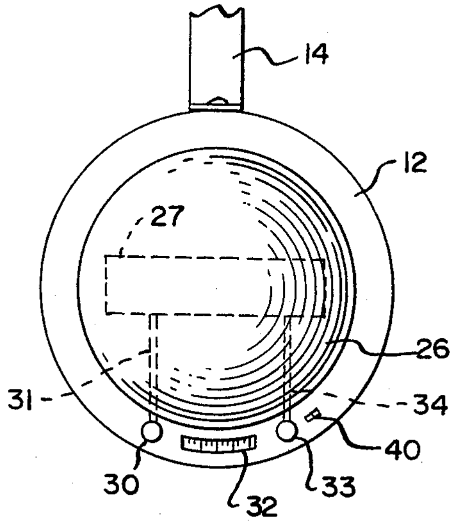
FIG. 2 is a plane view of one of the housings of FIG. 1.

As seen in FIG. 2, housing 12 has an outer convex portion 26 in which a miniaturized self-contained radio receiver 27 is located. Receiver 27 is tuned to a selected station by manipulation of a tuning knob 30 which connects through suitable shaft means 31 with a conventional tuning selector (not illustrated) in the receiver. A tuning dial 32, ganged to tuning knob 30, is located on housing 12 to indicate the station selected by the user. If desired, tuning dial 32 may be eliminated and tuning knob 30 itself may be directly calibrated with indicia suitable for this purpose. A combination on-off and volume control knob 33 is connected through suitable shaft means 34 with receiver 27. Radio receiver 27 may be a conventional transistorized AM receiver powered by small DC batteries, and having an audio output at 36 for connection with sound reproducing devices. Convex portion 26 may be made detachable from the remainder of housing 12 for the purpose of replacing the DC batteries used in radio receiver 27 when necessary.

Figure 3:
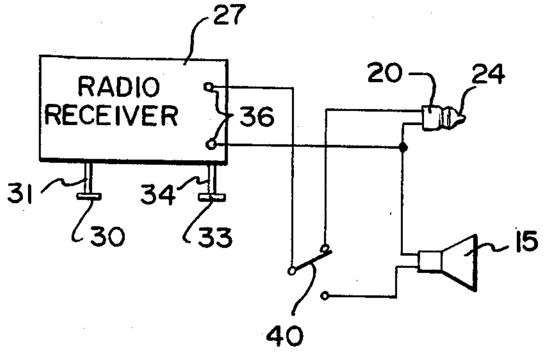
FIG. 3 is a schematic wiring diagram for the components mounted in the headphone.

A two position switch 40, mounted on housing 12 for manipulation by the user, allows audio output 36 from radio receiver 27 to be connected either to loudspeaker 15 or earpiece 20, as seen schematically in FIG. 3. Switch 40 may take the form of a single-pole double-throw slide or toggle switch. When switch 40 is in the position illustrated in FIG. 3, only the wearer of headphone 10 will be able to hear the audio output from the receiver through earpiece 20. When the wearer wishes others to hear the audio output from the radio receiver, he may remove the headphone from his head and throw switch 40 to its opposite contact, thereby connecting loudspeaker 15 to the receiver. Alternatively, the wearer can twist inner housing 17 away from a position directly adjacent his head, before throwing switch 40 to the loudspeaker position in order to allow others to hear the audio output from radio receiver 27.

I claim:

1. In headphone apparatus having a first housing adapted to be worn adjacent one ear of a wearer and a second housing adapted to be worn adjacent the opposite ear of the wearer, the improvement comprising:
   - loudspeaker sound reproducing means mounted on said first housing for converting electrical energy of a first intensity into sound waves of sufficient intensity to be heard by a plurality of persons;
   - earpiece sound reproducing means mounted on said second housing and adapted to be inserted into the ear of the wearer for converting electrical energy of said same first intensity into sound waves of an intensity less than said sufficient intensity and suitable for hearing by the wearer; and
   - switch means mounted on said headphone apparatus for selecting one of said sound reproducing means.

2. The improvement of claim 1 including a self-contained radio receiver mounted on one of said housings and having an audio output connected to said switch means for reproduction from said loudspeaker or said earpiece.

3. The improvement of claim 2 wherein said radio receiver includes a first shaft for tuning the receiver to different radio stations, and a knob connected to said first shaft and mounted on the outside of said housing for manipulation by the wearer.

4. The improvement of claim 3 including a second shaft for adjusting the volume of the audio output from said radio receiver, and knob means connected to said second shaft and mounted on the outside of said housing for manipulation by the wearer.

5. The improvement of claim 4 wherein said radio receiver includes a tuning dial ganged to said first shaft and located on the outside of said housing.

6. The improvement of claim 4 wherein said radio receiver is located within said second housing for said earpiece, with said knob means and said switch means being mounted on the outside of said second housing.

References Cited

UNITED STATES PATENTS

| | | | |
|---|---|---|---|
| 2,554,270 | 5/1951 | Rosenberg ----- | 325—361 XR |
| 3,234,467 | 2/1966 | Haveson ---------- | 325—361 |
| 3,280,273 | 10/1966 | Flygstad et al. ------ | 179—156 |

OTHER REFERENCES

Superhed in a Headphone by Philip De La Roza in Radio-Electronics, September 1961, pp. 44–46.

ROBERT L. GRIFFIN, Examiner

R. J. BELL, Assistant Examiner

U.S. Cl. X.R.

179—156; 181—18